(12) United States Patent
Sakai et al.

(10) Patent No.: US 9,777,935 B2
(45) Date of Patent: Oct. 3, 2017

(54) HUMIDIFIER AND AIR-CONDITIONING APPARATUS INCLUDING THE SAME

(71) Applicant: Mitsubishi Electric Corporation, Chiyoda-ku (JP)

(72) Inventors: Takahiro Sakai, Chiyoda-ku (JP);
Akira Morikawa, Chiyoda-ku (JP);
Yasutaka Inanaga, Chiyoda-ku (JP);
Kazuya Michikami, Chiyoda-ku (JP);
Masaru Takada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/781,487

(22) PCT Filed: Jan. 30, 2014

(86) PCT No.: PCT/JP2014/052169
§ 371 (c)(1),
(2) Date: Sep. 30, 2015

(87) PCT Pub. No.: WO2014/174867
PCT Pub. Date: Oct. 30, 2014

(65) Prior Publication Data
US 2016/0040897 A1    Feb. 11, 2016

(30) Foreign Application Priority Data
Apr. 22, 2013  (JP) .................. 2013-089317

(51) Int. Cl.
*F24F 6/04*   (2006.01)
*F24F 13/08*  (2006.01)

(52) U.S. Cl.
CPC ............... *F24F 6/04* (2013.01); *F24F 13/08* (2013.01)

(58) Field of Classification Search
CPC .................. F24F 6/04; F24F 13/08
(Continued)

(56) References Cited

U.S. PATENT DOCUMENTS

| 1,316,144 | A | * | 9/1919 | Craven ..................... F24F 6/04 |
|---|---|---|---|---|
|  |  |  |  | 261/106 |
| 1,367,701 | A | * | 2/1921 | Haynes ..................... F24F 6/04 |
|  |  |  |  | 261/103 |

(Continued)

FOREIGN PATENT DOCUMENTS

| JP | 62 172120 | 7/1987 |
|---|---|---|
| JP | 2 251032 | 10/1990 |

(Continued)

OTHER PUBLICATIONS

Office Action issued on Dec. 15, 2015 in Japanese Patent Application No. 2015-513581 with English translation.

(Continued)

*Primary Examiner* — Charles Bushey
(74) *Attorney, Agent, or Firm* — Oblon, McClelland, Maier & Neustadt, L.L.P.

(57) ABSTRACT

A humidifier, including: a flat humidification member formed of a water absorbing member and arranged in an upright posture; a nozzle serving as a water supply unit configured to supply water to the humidification member; and an airflow direction changing plate arranged with a clearance secured between the airflow direction changing plate and the humidification member. On a flat surface of the airflow direction changing plate opposed to the flat humidification member, an airflow direction changing portion is arranged to project toward the flat humidification member, the airflow direction changing portion being configured to (Continued)

change a direction of an air current flowing between the flat humidification member and the airflow direction changing plate.

7 Claims, 18 Drawing Sheets

(58) Field of Classification Search
USPC .................................. 261/102, 103, 105, 106
See application file for complete search history.

(56) References Cited

U.S. PATENT DOCUMENTS

| | | | | |
|---|---|---|---|---|
| 1,394,924 A * | 10/1921 | MacFadden | ............. | F24F 3/12 62/312 |
| 1,898,591 A * | 2/1933 | Mohler | ..................... | F24F 3/12 261/103 |
| 2,498,427 A * | 2/1950 | Kohut | ....................... | F24F 3/14 261/105 |
| 3,087,412 A * | 4/1963 | Holmes | .................. | E06B 7/082 454/277 |
| 5,315,843 A * | 5/1994 | Morozov | ............. | F24F 5/0007 62/309 |
| 5,718,848 A * | 2/1998 | James | .................. | F24F 5/0007 261/104 |
| 2007/0164461 A1* | 7/2007 | Wang | .................... | F24F 13/222 261/101 |

FOREIGN PATENT DOCUMENTS

| | | |
|---|---|---|
| JP | 4-306435 A | 10/1992 |
| JP | 4 320742 | 11/1992 |
| JP | 5 33973 | 2/1993 |
| JP | 7 167469 | 7/1995 |
| JP | 8 128682 | 5/1996 |
| JP | 9 324930 | 12/1997 |
| JP | 2003 74917 | 3/2003 |
| JP | 2003 176939 | 6/2003 |
| JP | 2005-83590 A | 3/2005 |

OTHER PUBLICATIONS

International Search Report issued Mar. 25, 2014 in PCT/JP2014/052169 Filed Jan. 30, 2014.
Office Action issued Feb. 13, 2017 in German Patent Application No. 11 2014 002 085.0 (with English translation).
Office Action issued Sep. 22, 2016 in Canadian Patent Application No. 2,907,883.
Office Action dated May 29, 2017 in Canadian Patent Application No. 2,907,883.
Office Action dated Jun. 1, 2017 in Chinese Patent Application No. 2014-80022821.3 with English translation.

* cited by examiner

F I G. 1
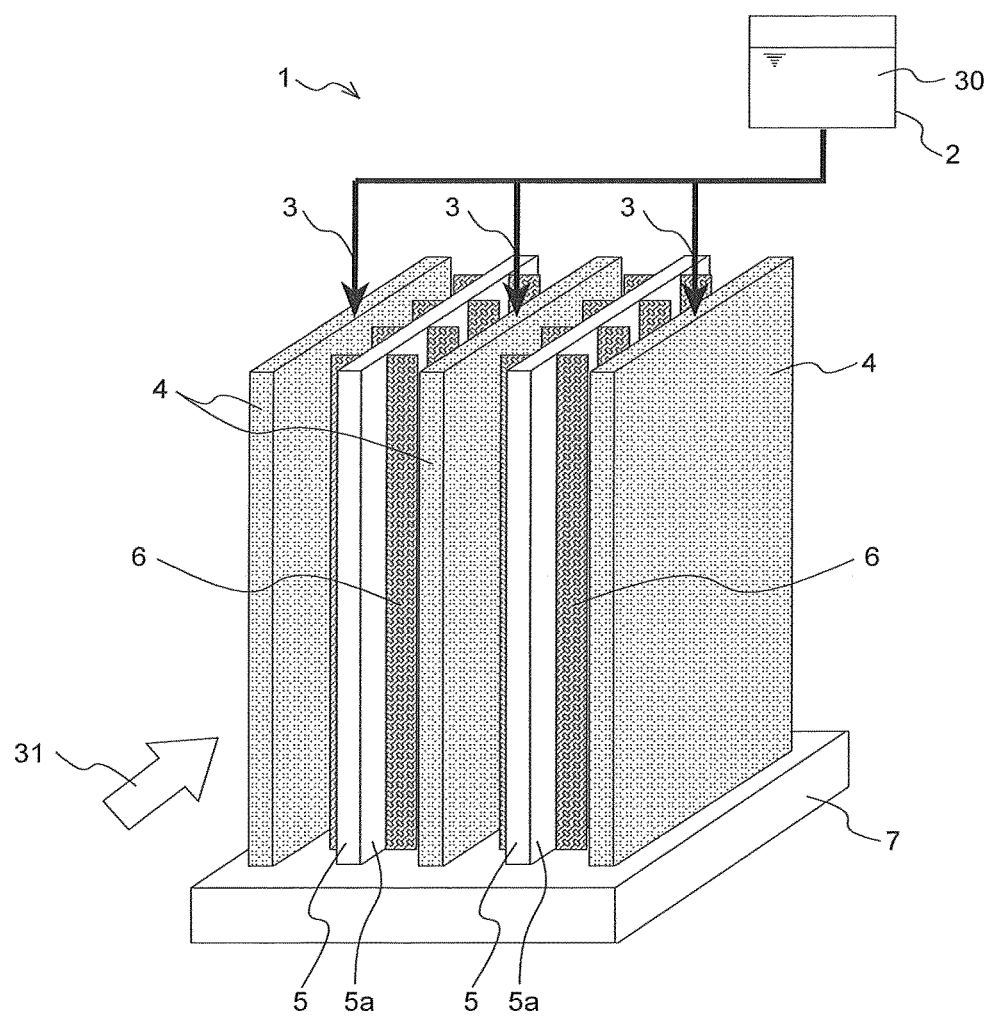

F I G. 4
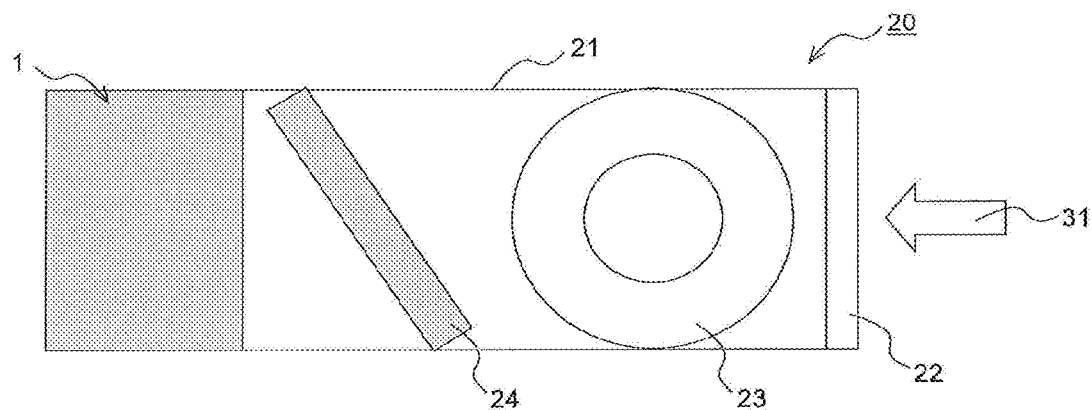

F I G. 5
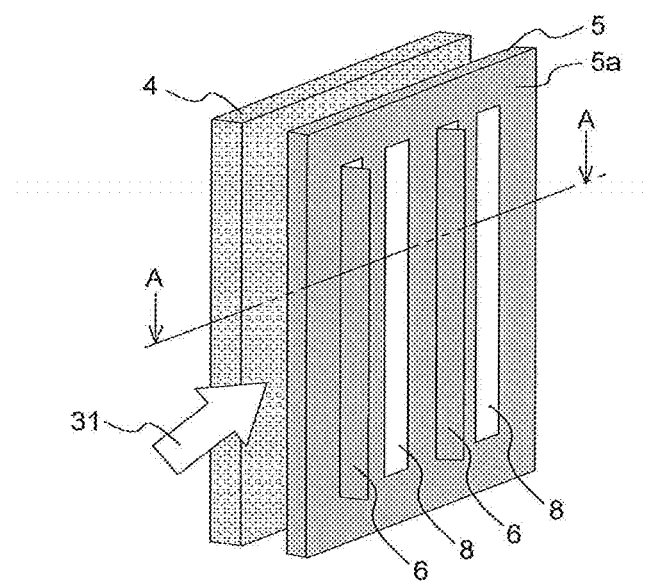

(ANGLE FORMED BETWEEN DOWNSTREAM SURFACE OF AIRFLOW DIRECTION CHANGING PORTION AND FLAT SURFACE OF AIRFLOW DIRECTION CHANGING PLATE)

FIG. 12
(a)
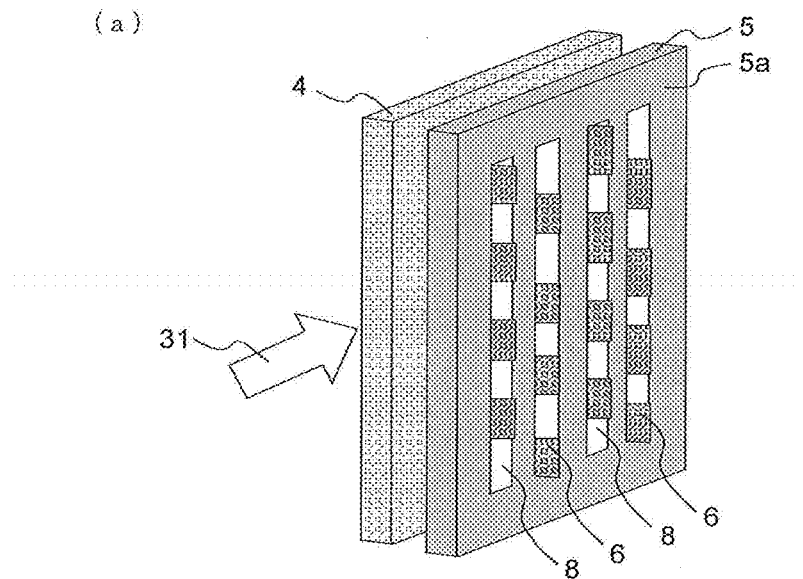
(b)
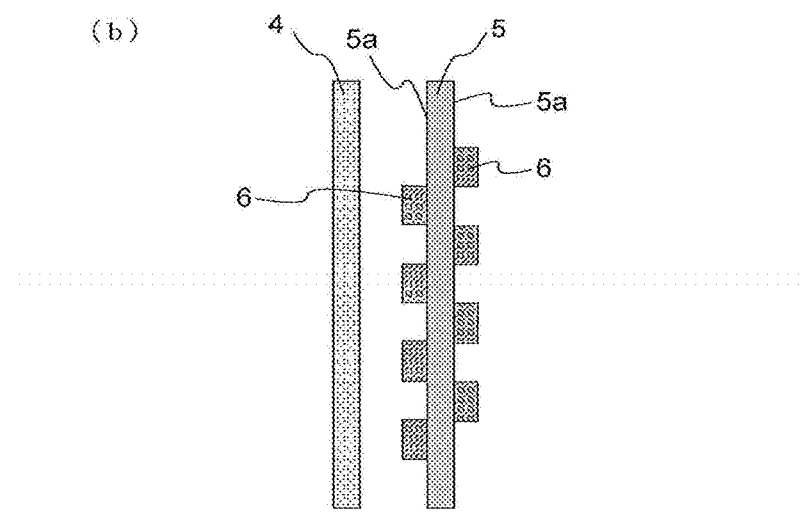

F I G. 1 6
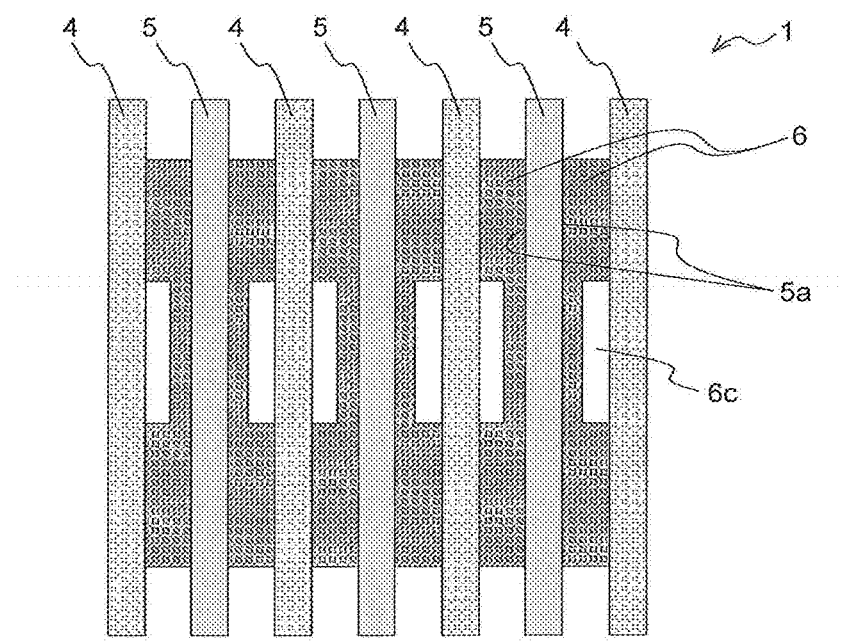

HUMIDIFIER AND AIR-CONDITIONING APPARATUS INCLUDING THE SAME

TECHNICAL FIELD

The present invention relates to a humidifier and an air-conditioning apparatus including the humidifier.

BACKGROUND ART

The so-called Building Administration Law (Law on Maintenance of Sanitation in Buildings) provides that indoor temperature be maintained at 17 [degrees C.] to 28 [degrees C.] and relative humidity be maintained at 40 [%] to 70 [%] as control standard values for the air environment in specific buildings such as commercial facilities and offices having floor areas of 3,000 [$m^2$] or more. The indoor temperature is controlled relatively easily along with the growing use of air-conditioners (air-conditioning apparatus). However, it is hard to say that the relative humidity is controlled sufficiently. In particular, lack of the amount of humidification in winter is a challenge to address.

As related-art indoor humidification methods, evaporative, steam, and water spray methods are given as examples. Among those methods, the evaporative method is a method of causing air to pass through a filter having water absorption capability to exchange heat between water contained in the filter and an air current, thereby evaporating the water from the filter for indoor humidification. Further, the steam method is a method of an energizing heating unit for heating water inside a water reservoir, thereby evaporating water for indoor humidification. Still further, the water spray method is a method of atomizing water through pressurization to exchange heat between the atomized water and the air current, thereby performing indoor humidification.

As a related-art humidifier using the evaporative humidification method, there is proposed a humidifier constructed such that a plurality of rectangular strip-like humidification elements each formed of a sintered compact of hydrophilic polyethylene are inserted in line at an interval of 1 cm into a small box having a water tank (see, for example, Patent Literature 1).

Further, as another related art using the evaporative humidification method, there is disclosed an evaporative humidifier constructed such that a plurality of humidification elements each formed of a water absorbing material are arranged in an air passage, the ends of the humidification elements on one side are immersed into a water supply tank to absorb water, and the absorbed water is evaporated by the humidification elements, in which raised portions are formed on at least one surface of each of the humidification elements (see, for example, Patent Literature 2).

Further, as another related-art humidifier using the evaporative humidification method, there is proposed a humidifier constructed such that wet plates having water retention properties are arranged to face an air current (see, for example, Patent Literature 3).

Further, as another related art using the evaporative humidification method, there is proposed a humidification unit constructed such that water retaining members each partially having projecting portions formed thereon are arranged in a laminated form on a porous composite sheet made of fibers of polyethylene terephthalate or the like (see, for example, Patent Literature 4).

CITATION LIST

Patent Literature

Patent Literature 1: Japanese Unexamined Patent Application Publication No. Sho 62-172120 (Page 3, FIG. 1-a)

Patent Literature 2: Japanese Unexamined Patent Application Publication No. Hei 2-251032 (Page 2, FIG. 1)

Patent Literature 3: Japanese Unexamined Patent Application Publication No. Hei 9-324930 (Page 4 to Page 6, FIG. 2, FIG. 5, and FIG. 11)

Patent Literature 4: Japanese Unexamined Patent Application Publication No. Hei 7-167469 (Page 2 to Page 3, FIG. 1 to FIG. 4)

SUMMARY OF INVENTION

Technical Problems

In the humidifier disclosed in Patent Literature 1, air is caused to pass between the humidification elements, and hence the humidity of the air current is increased after the air passes between the humidification elements. In the structure of this apparatus, however, the air humidified by water moved from the humidification elements is air passing through positions proximate to surface layer portions of the humidification elements, for example, air passing within a range of several millimeters measured orthogonally from the surface layer portions of the humidification elements. Therefore, water is not moved to air passing through a space distanced from the surface layer portions of the humidification elements. As a result, there is a problem in that the rate of increase in humidity of air after passing between the humidification elements is low.

In the humidifier disclosed in Patent Literature 2, the raised portions are formed on at least one surface of each of the humidification elements, and hence turbulence occurs in an air current of air flowing between the raised portion and the raised portion formed adjacent thereto. For this reason, it is considered that this can lead to enhanced performance of the humidification. However, turbulence does not substantially occur in the air flowing between the humidification element and the humidification element formed adjacent thereto, thereby causing a problem in that high humidification performance is difficult to attain.

In the humidifier disclosed in Patent Literature 3, the wet plates (humidification members) are arranged to face the air current. In the structure of this apparatus, however, the air current faces all of the plurality of wet plates, thereby causing a problem in that pressure loss is significant to increase a load on an air-sending device.

In the humidifier disclosed in Patent Literature 4, the projecting portions are at least partially formed on each of the water retaining members (humidification members), and a plurality of those water retaining members are arranged in a laminated form to construct the humidification unit. However, the air flowing between the water retaining members flows along the side surfaces of the water retaining members in a direction parallel to the water retaining members, and hence turbulence of air does not occur in the vicinity of the water retaining members, thereby causing a problem in that high humidification performance is difficult to attain.

The present invention has been made in view of the problems as described above, and therefore provides a humidifier and an air-conditioning apparatus including the humidifier, which are capable of enhancing humidification performance while suppressing complication of processing of humidification members (humidification elements) and also suppressing increase in pressure loss.

Solution to Problems

According to one embodiment of the present invention, there is provided a humidifier, including: flat humidification member formed of a water absorbing member and arranged in an upright posture; a water supply unit configured to supply water to the flat humidification member; and an airflow direction changing plate arranged with a clearance secured between the airflow direction changing plate and the flat humidification members. On a surface of the airflow direction changing plate opposed to the flat humidification members, an airflow direction changing portion is arranged to project toward the flat humidification members, the airflow direction changing portion being configured to change a direction of an air current flowing between the flat humidification members and the airflow direction changing plate.

According to one embodiment of the present invention, there is provided an air-conditioning apparatus, including the above-mentioned humidifier.

Advantageous Effects of Invention

According to the one embodiment of the present invention, the airflow direction changing portion arranged on the airflow direction changing plate causes turbulence in the air flowing between the humidification member and the airflow direction changing plate, and hence the gas-liquid contact is promoted between the humidification member and the air, thereby being capable of enhancing the humidification performance. Further, the humidification performance can be enhanced through the arrangement of the airflow direction changing plate between the humidification members, thereby being capable of reducing the number of humidification members. As a result, the amount of water to be supplied to the humidification members can be reduced, which leads to a high degree of economy.

BRIEF DESCRIPTION OF DRAWINGS

FIG. 1 is a schematic structural view of a humidifier 1 according to Embodiment 1.

FIG. 4 is a schematic structural view of an air-conditioning apparatus 20 including the humidifier 1 according to Embodiment 1.

FIG. 5 is a perspective view of a humidification member 4 and an airflow direction changing plate 5 according to a first example of Embodiment 1.

FIG. 12 are explanatory views of an airflow direction changing plate 5 according to a modification example of Embodiment 1.

FIG. 16 is a schematic sectional view taken along the line C-C of FIG. 15.

DESCRIPTION OF EMBODIMENTS

Figure 2:
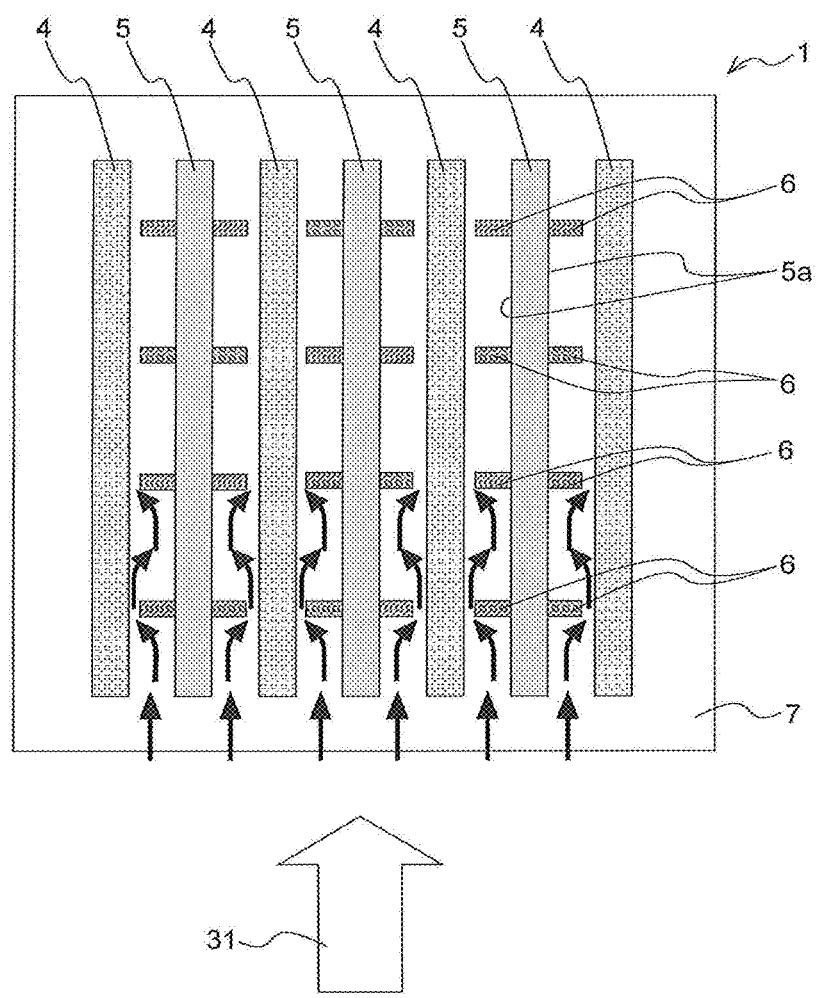
FIG. 2 is a schematic structural view of the humidifier 1 according to Embodiment 1 when viewed in a direction from directly above the humidifier 1, which is orthogonal to an airflow direction.

Now, a humidifier and an air-conditioning apparatus including the humidifier according to embodiments of the present invention are described with reference to the drawings. Note that, the present invention is not limited to the forms in the drawings as described below. Further, the terms indicating directions (for example, "up", "down", "right", "left", "front", and "back") are used as appropriate for facilitating understanding in the following description. Those terms are used for the description but not intended to limit the present invention.

Embodiment 1

(Structure of Humidifier)

FIG. 1 is a schematic structural view of a humidifier 1 according to Embodiment 1. FIG. 2 is a schematic structural view of the humidifier 1 according to Embodiment 1 when viewed in a direction from directly above the humidifier 1, which is orthogonal to an airflow direction.

As illustrated in FIG. 1, the humidifier 1 includes a water reservoir 2 for storing humidification water 30 to be used for humidifying a space to be humidified, nozzles 3 for supplying the humidification water 30 from the water reservoir 2 to humidification members 4, one or more (three in FIG. 1) humidification members 4 arranged in an upright posture, airflow direction changing plates 5 including airflow direction changing portions 6 and being arranged so as to be opposed to side surface portions of the humidification members 4, and a drain pan 7 for receiving surplus water dripped from the humidification members 4. The plurality of humidification members 4 and the plurality of airflow direction changing plates 5 are alternately arranged with clearances secured therebetween, and air 31 to be blown from an air-sending unit (not shown) passes through the clearances. Note that, the airflow direction changing herein refers to changing of a flow direction of the air.

Note that, in practical use, the water reservoir 2, the nozzles 3, the humidification members 4, the airflow direction changing plates 5, and the drain pan 7 are fixed by an arbitrary support or the like, which is formed of arbitrary members made of a synthetic resin, a metal, or the like. The structure of the support is not particularly limited, and only needs to be selected as appropriate depending on the usage of the humidifier 1.

As the humidification water 30, any of pure water, tap water, soft water, and hard water may be used when the humidification water 30 is used for the purpose of humidifying the space to be humidified. To reduce clogging of voids 9 of the humidification member 4 (described later with reference to FIG. 3), which may be caused due to scales as typified by calcium carbonate scale, however, it is preferred to use water with a low content of mineral components including calcium ions or magnesium ions. This is because the use of humidification water 30 with a high mineral content may cause the clogging of the voids 9 of the humidification member 4 due to solids generated through reaction between ionic components in a solution and carbon dioxide. Further, humidification water 30 whose ionic components are removed with an ion exchange membrane for cations and anions or the like may be used instead.

The water reservoir 2 stores the humidification water 30 to be supplied to the humidification members 4 through the nozzles 3. A drive unit such as a pump (not shown) is arranged on the water reservoir 2. Through an operation of the drive unit, the humidification water 30 stored in the water reservoir 2 is supplied by dripping on upper portions of the humidification members 4 through the nozzles 3. Note that, it is only necessary that the drive unit be capable of transporting the humidification water 30. For example, the drive unit is a non-positive displacement pump or a positive displacement pump, and is not particularly limited.

(Nozzle)

The nozzle 3 is arranged directly above the humidification member 4 to supply the humidification water 30 transported from the water reservoir 2 to the upper portion of the humidification member 4 by dripping. In this embodiment, the water reservoir 2 and the nozzle 3 serve as a water supply unit. The nozzle 3 has a hollow shape, and the outer diameter and the inner diameter of the nozzle 3 only need to be selected depending on the size of the humidification member 4. Further, the distal end of the nozzle 3 may have any shape such as a triangular pyramid shape, a circular tube shape, or a square tube shape. In this case, the distal end has a triangular pyramid shape as a preferred shape thereof, and an outlet of the nozzle 3 has a hole diameter of 0.5 mm. It is preferred that the nozzle 3 has an acute distal end because water droplets are well dripped off the nozzle 3. It is also preferred that the nozzle 3 has a more acute distal end, but when the distal end is excessively acute, the nozzle 3 is difficult to handle and reduced in strength. For this reason, it is preferred that the acute angle falls within a range of from 10 degrees to 45 degrees. Further, when the hole diameter of the outlet of the nozzle 3 is excessively large, the humidification water 30 is excessively supplied so that the amount of unnecessary water is increased. When the hole diameter of the outlet of the nozzle 3 is excessively small, on the other hand, the nozzle 3 may be clogged with particles or scales mixed into the humidification water 30. For this reason, it is preferred that the hole diameter of the nozzle 3 falls within a range of from 0.1 mm to 0.6 mm.

A material for the nozzle 3 may be a metal such as stainless steel, tungsten, titanium, silver, or copper, or a resin such as PTFE, polyethylene, or polypropylene. However, the material for the nozzle 3 is not limited thereto.

The number of the nozzles 3 may be selected in consideration of a length of the humidification member 4 in the airflow direction, that is, a length ranging from an upstream end portion of the humidification member 4 to a downstream end portion thereof. When the length of the humidification member 4 in the airflow direction is increased, and when the number of the nozzles 3 is one, the humidification member 4 may have unevenness in water content in its airflow direction. For this reason, it is preferred that a plurality of nozzles 3 be arranged along the airflow direction. In the example of the nozzle 3 of this embodiment, a single nozzle 3 may suffice when the length of the humidification member 4 in the airflow direction is 60 mm or less, but a plurality of nozzles 3 are preferred when the length of the humidification member 4 in the airflow direction is more than 60 mm.

It is necessary that the amount of the humidification water 30 to be supplied to the humidification members 4 through the nozzles 3 be set larger than the amount of water to be used for actual humidification. When the amount of the humidification water 30 is set excessively large, however, unnecessary water to be drained as surplus water is increased. For this reason, it is desired that the amount of the humidification water 30 be controlled appropriately. For example, when each humidification member 4 has a humidification performance of 2,000 mL/h/m$^2$ and a size of 200 mm by 50 mm, and when humidification can be achieved on both front and back sides of the humidification member 4, the humidification amount of a single humidification member 4 is 40 mL/h. Therefore, it is desired that the humidification water 30 be supplied by an amount within a range of from 60 mL/h to 200 mL/h, which is 1.5 times to 5 times as large as the humidification amount.

Further, a water absorbing member made of an arbitrary water absorbing material may be arranged in contact with the humidification member 4 at a position between the nozzle 3 and the humidification member 4. When a plurality of humidification members 4 are arranged, and when the nozzles 3 are arranged corresponding to the plurality of humidification members 4, respectively, the number of the nozzles 3 is increased, which may result in failure to drip water appropriately. Therefore, the water absorbing member is arranged across and in contact with the plurality of humidification members 4, and the humidification water 30 is supplied to the water absorbing member through the nozzles 3. With this structure, even when a plurality of humidification members 4 are arranged, the humidification water 30 can be supplied to the humidification members 4 more securely.

(Humidification Member)

The humidification member 4 is formed of a water absorbing member, and for example, has a three-dimensional mesh structure. The three-dimensional mesh structure refers to a structure similar to that of resin foam having high water absorption property, such as sponge.

Figure 3:
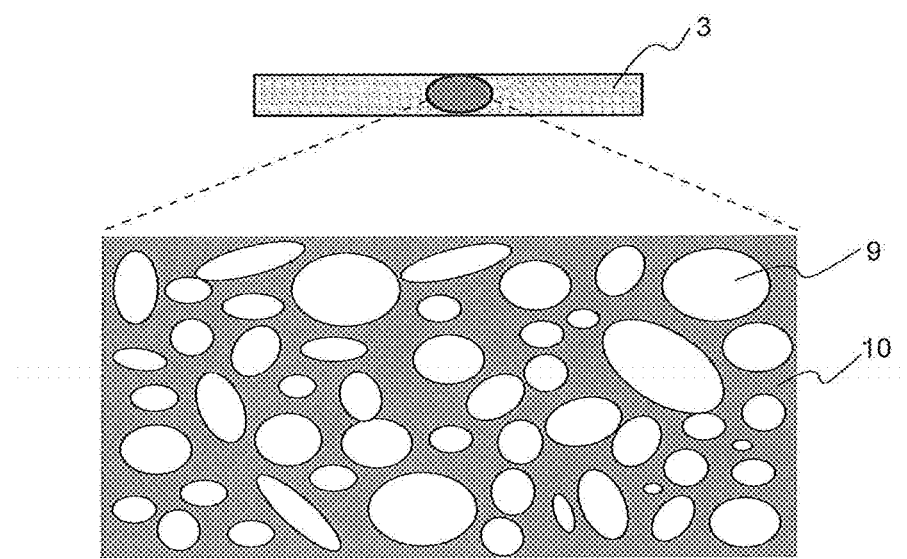
FIG. 3 is a partially enlarged sectional view of a humidification member 4 according to Embodiment 1.

Now, an example of the humidification member 4 is described in detail. FIG. 3 is a partially enlarged sectional view of the humidification member 4 according to Embodiment 1. As illustrated in FIG. 3, the humidification member 4 includes a body 10, and a plurality of voids 9 formed in the body 10. The humidification member 4 according to this embodiment is made of a material such as a porous metal, ceramic, resin, or fiber, and each of those materials is formed into foam or mesh.

When the humidification member 4 is made of a metal, the kind of metal is not particularly limited, and examples thereof include a metal such as titanium, copper, or nickel, a noble metal such as gold, silver, or platinum, and an alloy such as a nickel alloy or a cobalt alloy. Those materials may be used alone or in combination. Among those materials, titanium is a most preferred kind of metal because titanium suppresses generation of corona products such as ozone due to its catalytic effect, has excellent resistance to electric corrosion and electric abrasion, and retains the shape of the humidification member 4 over a long period of time to enable stable humidification.

When the humidification member 4 is made of a ceramic, a material therefor is not particularly limited, and specific examples thereof include alumina, zirconia, mullite, cordierite, and silicon carbide.

When the humidification member 4 is made of a resin, a material therefor is not particularly limited, and specific examples thereof include polyethylene, polypropylene, and an ethylene-vinyl acetate copolymer.

When the humidification member 4 is made of a fiber, a material therefor is not particularly limited, and specific examples thereof include acetate, polyester, and nylon. In addition, a fiber obtained by coating a porous substance formed by using a resin as a material with metal powder may also be used.

The surface layer of the humidification member 4 may be subjected to hydrophilic treatment from the viewpoint of increasing the amount of the humidification water 30 to be retained and preventing degradation of water absorption capability. The types of method of hydrophilic treatment are not limited as well. For example, the hydrophilic treatment may be performed by coating with a hydrophilic resin, or by corona discharge.

The shape of the humidification member 4 is not particularly limited as well. For example, the humidification member 4 may have a flat shape, a quadrangular prism shape, or a columnar shape. The shape only needs to be adjusted as appropriate depending on the size of the humidifier 1 to be manufactured.

It is desired that the length of the humidification member 4 in the airflow direction (length ranging from the upstream side to the downstream side) be 100 mm or less. When air is caused to pass along the humidification member 4 having the humidification water 30 supplied thereto, the humidification water 30 contained in the humidification member 4 is diffused into a gas phase to humidify the air. The water concentration of the gas phase is increased at a downstream portion of the humidification member 4 in the airflow direction, and hence the water saturation degree is increased. Therefore, when the humidification member 4 is elongated in the airflow direction, the humidification performance per unit area is decreased. For this reason, it is desired that the length of the humidification member 4 in the airflow direction be 100 mm or less.

The thickness of the humidification member 4 only needs to be adjusted as appropriate depending on the size of the humidifier 1 to be manufactured. For example, a sheet-like humidification member 4 having a thickness of 0.5 mm or more and 2 mm or less may be manufactured and then processed into a desired shape by cutting. The processing method is not particularly limited, and for example, various methods such as wire cutting, laser cutting, press stamping, shaving, and manual cutting or bending may be employed.

(Airflow Direction Changing Plate)

The airflow direction changing plate 5 includes one or a plurality of airflow direction changing portions 6, and is arranged adjacent to the humidification member 4 with a given clearance secured therebetween. When a plurality of humidification members 4 are arranged as in this embodiment, each of the airflow direction changing plates 5 is arranged via a given clearance secured between the airflow direction changing plate 5 and each of the humidification members 4, and the humidification members 4 and the airflow direction changing plates 5 are arrayed alternately. Further, when a single humidification member 4 is arranged, the airflow direction changing plate 5 is arranged with a given clearance secured between the airflow direction changing plate 5 and the humidification member 4. The airflow direction changing plate 5 is configured to change a current of the air 31 so as to be blown in a direction normal to a planar surface of the one or the plurality of humidification members 4. The airflow direction changing plate 5 has its flat surface 5a formed in a direction identical with the airflow direction of the air 31.

The airflow direction changing portion 6 is a member arranged on the flat surface 5a of the airflow direction changing plate 5 opposed to the humidification member 4 to project from the flat surface 5a for the purpose of changing the direction of the air to the direction normal to the planar surface of the humidification member 4. In this embodiment, as illustrated in FIG. 1, the airflow direction changing portion 6 is formed into a plate shape extending along a height direction of the airflow direction changing plate 5. On each of the flat surfaces 5a on both sides of the airflow direction changing plate 5, the plurality of airflow direction changing portions 6 are arranged at regular intervals along the airflow direction. Note that, an angle of the air impinging on the surface of the humidification member 4 is not limited to the angle corresponding to the normal direction, and the air may impinge on the planar surface of the humidification member 4 at a given angle. Further, as illustrated in FIG. 2, the distal end portion of the airflow direction changing portion 6 in a direction of projecting from the airflow direction changing plate 5 is kept out of contact with the humidification member 4, and hence an air passage is secured between the distal end of the airflow direction changing portion 6 and the humidification member 4.

As a method of manufacturing the airflow direction changing plate 5, for example, wire cutting, laser cutting, or press working may be performed for a thin metal plate to form the airflow direction changing portions 6, but the method of manufacturing the airflow direction changing plate 5 is not limited to those methods. Alternatively, airflow direction changing portions 6 prepared as separate members may be fixed to the flat surfaces 5a of the airflow direction changing plate 5.

Further, any material may be employed for the airflow direction changing plate 5 as long as the shape of the airflow direction changing portion 6 is retainable. For example, a metal, a ceramic, a resin, a fiber, or foam or mesh thereof may be employed.

(Air-Conditioning Apparatus)

FIG. 4 is a schematic structural view of an air-conditioning apparatus 20 including the humidifier according to Embodiment 1. The air-conditioning apparatus 20 includes an air-conditioning apparatus housing 21 having an airflow passage formed therein, a filter 22 arranged at an inflow port of air flowing into the air-conditioning apparatus housing 21, an air-sending device 23 and a heat exchanger 24 arranged inside the air-conditioning apparatus housing 21, and the humidifier 1 arranged inside the air-conditioning apparatus housing 21 as well. In the example of FIG. 4, the air-sending device 23, the heat exchanger 24, and the humidifier 1 are arranged in the stated order from an upstream side of an airflow direction of air to be generated through an operation of the air-sending device 23, but the arrangement of those components is not limited to the arrangement illustrated in FIG. 4. The humidifier 1 may be arranged on any of the upstream side and the downstream side of the heat exchanger 24. When the air-sending device 23 serving as the air-sending unit including a fan and a motor for rotating the fan is operated, air outside the air-conditioning apparatus housing 21 is sucked into the air-sending device 23 through the filter 22, and is blown from the air-sending device 23. The air blown from the air-sending device 23 exchanges heat at the heat exchanger 24, and is humidified at the humidifier 1.

(Operation of Humidifier)

Next, an operation of the humidifier 1 according to this embodiment is described with reference to FIG. 1 and FIG. 2.

The humidification water 30 stored in the water reservoir 2 is transported to the nozzles 3, and the nozzles 3 having the humidification water 30 transported thereto drip the humidification water 30 from above the humidification members 4 toward the upper portions of the humidification members 4. In this manner, the humidification water 30 is supplied to the humidification members 4. Due to a capillary force of each humidification member 4 and a gravity of the humidification water 30, the humidification water 30 is dispersed homogeneously in the entire humidification member 4 through the voids 9 (see FIG. 3) of the humidification member 4, and the humidification member 4 retains a given amount of the humidification water 30.

Then, the air 31 blown from the air-sending unit flows in the vicinity of the humidification members 4 as illustrated in FIG. 2, and the humidification water 30 is evaporated through gas-liquid contact between a part of the air 31 and the humidification water 30 retained by the humidification members 4. The air 31 containing the evaporated water is supplied to the space to be humidified, to thereby humidify the space to be humidified.

Further, another part of the air 31 blown from the air-sending unit impinges on the airflow direction changing plates 5 including the airflow direction changing portions 6 and being arranged between the one or the plurality of humidification members 4, and hence the direction of the air 31 is changed to the direction normal to the planar surface of each of the humidification members 4. Thus, turbulence occurs in the current of the air 31. The turbulence occurring in the current of the air 31 promotes gas-liquid contact between the turbulent air 31 and each of the humidification members 4, thereby being capable of enhancing the evaporability and the degree of humidification of the space to be humidified.

In the humidification water 30 retained by the humidification members 4, surplus humidification water 30 that is not used for the humidification is dripped from the humidification members 4, received by the drain pan 7 arranged below the humidification members 4, and is drained to the outside through a drain hole (not shown). Through the above-mentioned humidification operation of the humidifier 1, humidified air is supplied to the space to be humidified.

(Operation of Air-Conditioning Apparatus)

Next, an operation of the air-conditioning apparatus 20 including the humidifier 1 according to this embodiment is described with reference to FIG. 4.

As illustrated in FIG. 4, when the air-sending device 23 is operated, the air 31 outside the air-conditioning apparatus housing 21 is sucked into the air-conditioning apparatus housing 21 through the filter 22. At the heat exchanger 24, the air 31 is heated or cooled by exchanging heat, and then flows into the humidifier 1. The air 31 flowing into the humidifier 1 after the heat exchange is humidified by the humidification water 30 contained in the humidification members 4 as described above through the operation of the humidifier 1, and is supplied to an air-conditioned space.

Note that, when the humidifier 1 is arranged on the upstream side of the heat exchanger 24 unlike FIG. 4, the operation of the air-sending device 23 causes the air 31 outside the air-conditioning apparatus housing 21 to be sucked into the air-conditioning apparatus housing 21 through the filter 22, and the air 31 is humidified by the humidifier 1. The air 31 humidified by the humidifier 1 is heated or cooled by exchanging heat at the heat exchanger 24, and is supplied to the air-conditioned space.

(Action of Humidifier)

Actions of the humidifier 1 and the air-conditioning apparatus 20 including the humidifier 1 according to this embodiment are described focusing on an action to be attained by the airflow direction changing portions 6 arranged on the airflow direction changing plate 5.

Figure 6:
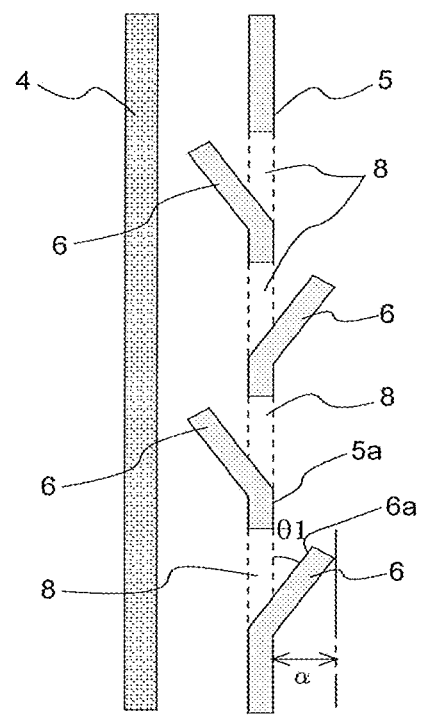
FIG. 6 is a schematic sectional view taken along the line A-A of FIG. 5.

First, description is made of a difference between the actions of the humidifier 1 according to the embodiment, which includes the airflow direction changing plate 5 including the airflow direction changing portions 6 as illustrated in FIG. 5 and FIG. 6, and a humidifier according to a comparative example, which includes a metal plate including no airflow direction changing portions 6 in place of the airflow direction changing plate 5.

First, an example of the structure of the airflow direction changing plate 5 and the airflow direction changing portions 6 according to this embodiment is described.

FIG. 5 is a perspective view of a humidification member 4 and an airflow direction changing plate 5 according to a first example of Embodiment 1. FIG. 6 is a schematic sectional view taken along the line A-A of FIG. 5. In the airflow direction changing plate 5 illustrated in FIG. 5 and FIG. 6, a plurality of rectangular opening portions 8 elongated in a vertical direction are formed at intervals secured along the airflow direction. The plate-like airflow direction changing portion 6 projects from one side of each opening portion 8 on the upstream side. As illustrated in FIG. 6, an angle θ1 formed between a downstream surface 6a of the airflow direction changing portion 6 and the flat surface 5a of the airflow direction changing plate 5 is 30 degrees. A length α of projection of the airflow direction changing portion 6 from the flat surface 5a of the airflow direction changing plate 5 is, for example, 1.9 mm. Further, as illustrated in FIG. 6, the airflow direction changing portions 6 are arranged alternately (in a staggered pattern) in the airflow direction on the flat surfaces 5a on both sides of the airflow direction changing plate 5. Still further, the airflow direction changing plate 5 is formed of a stainless steel plate.

As a method of manufacturing the airflow direction changing plate 5 illustrated in FIG. 5 and FIG. 6, for example, kerfs are each formed in a stainless steel plate by press working or the like so as to form three sides out of the four sides of the rectangular opening portion 8 other than the one long side, and a tongue formed on an inner side of the kerf (part of the stainless steel plate) is bent by the angle θ1 to form the airflow direction changing portion 6. Through this process, the airflow direction changing plate 5 having the airflow direction changing portions 6 and the opening portions 8 can be formed of a single stainless steel plate. Further, the airflow direction changing portions 6 may be fixed to the airflow direction changing plate 5 formed of a stainless steel plate by welding or the like. Note that, when the opening portions are formed in the airflow direction changing plate 5, a part of the air 31 may pass through the opening portions, and hence pressure loss can be reduced as compared to an airflow direction changing plate 5 having no opening portions.

Figure 7:
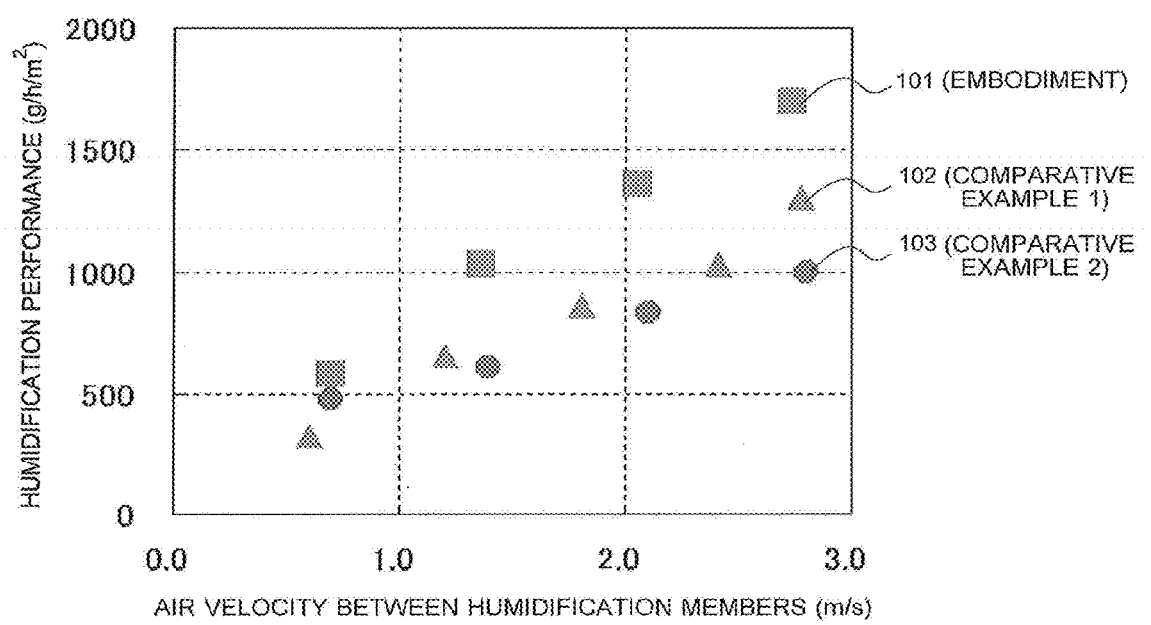
FIG. 7 is a graph showing results of measurement of humidification performance of the humidifier 1 according to the first example of Embodiment 1 and those of comparative examples.

FIG. 7 is a graph showing results of measurement of the humidification performance of the humidifier 1 according to the first example of Embodiment 1 and those of comparative examples. In FIG. 7, the horizontal axis represents an air velocity of air flowing between the humidification members 4, and the vertical axis represents a humidification amount of the humidification member 4 per unit area and unit time as the humidification performance. Note that, the humidification amount is a value estimated based on an amount of change of an absolute humidity, a rate of processing air, and a density of air, and the humidification performance on the vertical axis is a value obtained by dividing the humidification amount by the area of the humidification member 4.

Reference symbol 101 of FIG. 7 represents results of measurement of the humidification performance in a case where the air 31 is caused to pass along the humidification member 4 and the airflow direction changing plate 5 arranged at an interval of 2 mm according to the first example of Embodiment 1 as illustrated in FIG. 5 and FIG. 6.

Reference symbol 102 of FIG. 7 represents Comparative Example 1, specifically, results of measurement of the humidification performance in a case where the air 31 is caused to pass in such a modification example that a flat metal plate made of stainless steel similarly to the airflow direction changing plate 5 including the airflow direction changing portions 6 is arranged in place of the airflow direction changing plate 5 and the humidification member 4 and the metal plate are arranged at an interval of 2 mm.

Reference symbol 103 of FIG. 7 represents Comparative Example 2, specifically, results of measurement of the humidification performance in a case where the air 31 is caused to pass in such a modification example that a humidification member 4 is arranged in place of the airflow direction changing plate 5 including the airflow direction changing portions 6 and the adjacent humidification members 4 are arranged at an interval of 2 mm.

In Comparative Example 1 as represented by reference symbol 102 of FIG. 7, in which the humidification member 4 and the flat metal plate are arranged at an interval of 2 mm, it is observed that the humidification performance is enhanced in proportion to the air velocity between the humidification members. Also in Comparative Example 2 as represented by reference symbol 103, a tendency similar to that of Comparative Example 1 is exhibited.

Also in this embodiment as represented by reference symbol 101, in which the airflow direction changing plate 5 is arranged in place of the flat metal plate, a similar tendency is exhibited in terms of the fact that the humidification performance is enhanced in proportion to the air velocity between the humidification members, but higher humidification performance than that of the comparative examples is exhibited. Further, comparing the slopes of the humidification performance with respect to the air velocity between the humidification members, the slope of this embodiment as represented by reference symbol 101, in which the airflow direction changing plate 5 is used, has a greater inclination than the slopes of Comparative Examples 1 and 2. It is considered that the slope of the humidification performance is changed in Embodiment 1 because turbulence occurs in the vicinity of the planar surface portion of the humidification member 4 due to impingement of the air 31 on the planar surface of the humidification member 4 by the airflow direction changing plate 5.

As described above, the humidification performance is greatly enhanced in the first example of this embodiment (reference symbol 101) though the numbers and the areas of the humidification members 4 for use are set equal to each other in the first example of this embodiment (reference symbol 101) and Comparative Example 1 (reference symbol 102). The factors are suggested as follows. Turbulence of the air 31 flowing between the humidification member 4 and the airflow direction changing plate 5 is caused by the airflow direction changing plate 5 including the airflow direction changing portions 6, and the thickness of a water vapor saturation layer formed on the surface portion of the humidification member 4 is reduced due to generation of a vortex or convection and impingement on the humidification member 4. As a result, the gas-liquid contact between the humidification member 4 and the air 31 is promoted, thereby enhancing the humidification performance.

Next, description is made of an action to be attained by the angle $\theta1$ formed between the flat surface 5a of the airflow direction changing plate 5 and the downstream surface 6a of the airflow direction changing portion 6. The description is herein made of an action in a case where the air 31 is caused to flow in a direction opposite to that of FIG. 5 and FIG. 6.

Figure 8:
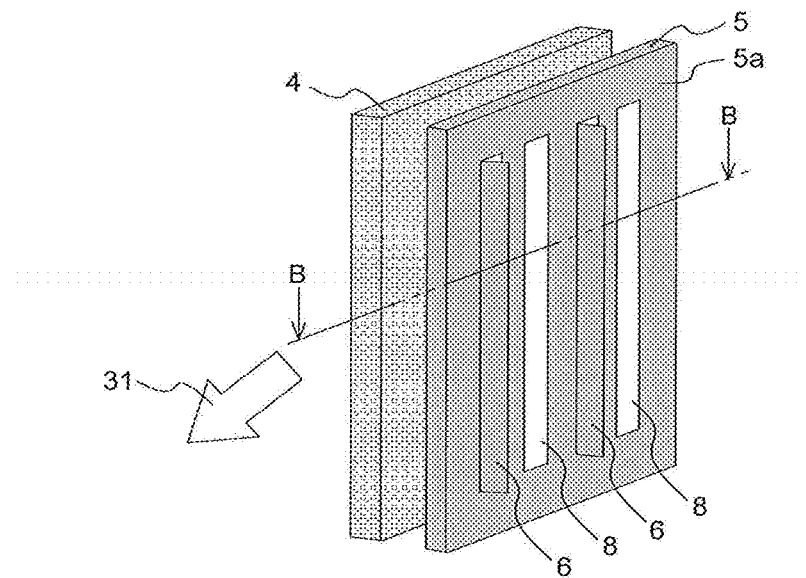
FIG. 8 is a perspective view of a humidification member 4 and an airflow direction changing plate 5 according to a second example of Embodiment 1.
Figure 9:
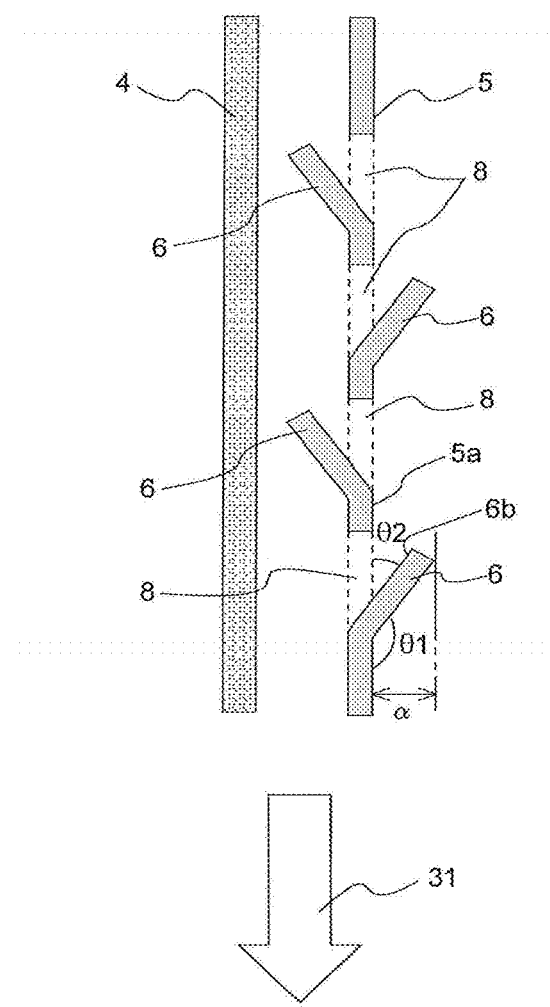
FIG. 9 is a schematic sectional view taken along the line B-B of FIG. 8.

FIG. 8 is a perspective view of a humidification member 4 and an airflow direction changing plate 5 according to a second example of Embodiment 1. FIG. 9 is a schematic sectional view taken along the line B-B of FIG. 8. The structures of the humidification member 4 and the airflow direction changing plate 5 illustrated in FIG. 8 and FIG. 9 are the same as the structures illustrated in FIG. 5 and FIG. 6, but the flow direction of the air 31 is different. That is, as illustrated in FIG. 9, the downstream surface 6a of the airflow direction changing portion 6 is located opposite to the downstream surface 6a illustrated in FIG. 5. An angle $\theta2$ formed between an upstream surface 6b of the airflow direction changing portion 6 and the flat surface 5a of the airflow direction changing plate 5 as illustrated in FIG. 9 is 30 degrees, which is equal to the angle $\theta1$ illustrated in FIG. 6. An angle $\theta1$ formed between the downstream surface 6a and the flat surface 5a of the airflow direction changing plate 5 is 150 degrees, which is obtained by subtracting $\theta2$ (30 degrees) from 180 degrees.

Figure 10:
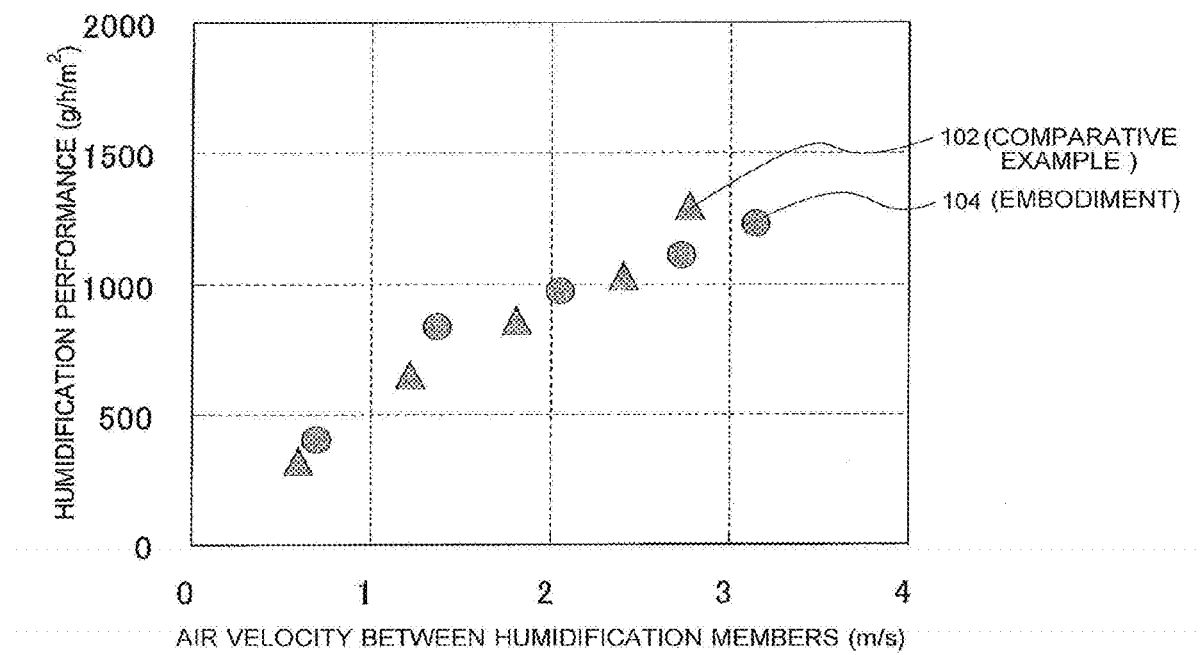
FIG. 10 is a graph showing results of measurement of humidification performance of the humidifier 1 according to the second example of Embodiment 1 and that of a comparative example.

FIG. 10 is a graph showing results of measurement of the humidification performance of the humidifier 1 according to the second example of Embodiment 1 and that of a comparative example. The horizontal axis and the vertical axis of FIG. 10 are the same as those of FIG. 7.

Reference symbol 104 of FIG. 10 represents results of measurement of the humidification performance in a case where the air 31 is caused to pass along the humidification member 4 and the airflow direction changing plate 5 arranged at an interval of 2 mm according to the second example of this embodiment as illustrated in FIG. 8 and FIG. 9.

Reference symbol 102 of FIG. 10 represents results of measurement of the humidification performance in a case where the air 31 is caused to pass in the same direction as that of FIG. 8 and FIG. 9 in such a modification example that a flat metal plate made of stainless steel similarly to the airflow direction changing plate 5 including the airflow direction changing portions 6 is arranged in place of the airflow direction changing plate 5 and the humidification member 4 and the metal plate are arranged at an interval of 2 mm.

In the comparative example as represented by reference symbol 102 of FIG. 10, in which the humidification member 4 and the flat metal plate are arranged at an interval of 2 mm, it is observed that the humidification performance is enhanced in proportion to the air velocity between the humidification members. As understood from comparison to the case of FIG. 7, the same humidification performance is plotted irrespective of the flow direction of the air 31.

In the second example of this embodiment as represented by reference symbol 104 of FIG. 10, in which the air 31 is caused to flow in the direction opposite to that of FIG. 5 and FIG. 6, on the other hand, the same tendency as that of the comparative example is exhibited in terms of the fact that the humidification performance is enhanced in proportion to the air velocity between the humidification members. Further, in the second example of this embodiment, the slope of the humidification performance with respect to the air velocity between the humidification members is also substantially the same as that of the comparative example. In this respect, the second example of this embodiment is different from the first example of this embodiment.

As described above, with the airflow direction changing plate 5 having the plurality of opening portions 8 and the airflow direction changing portions 6 each arranged on one side of the opening portion 8, which is located away from the upstream side, at the angle θ2 of 30 degrees formed between the flat surface 5a of the airflow direction changing plate 5 and the upstream surface 6b of the airflow direction changing portion 6 (the length α of projection of the airflow direction changing portion 6 from the flat surface 5a is 1.9 mm), the humidification performance is enhanced, but the slope of the humidification performance with respect to the air velocity between the humidification members is not changed substantially. It is considered that the humidification performance is enhanced because the impingement on the humidification member 4 is promoted due to influence of the airflow direction changing plate 5, but the effect of turbulence of the air 31 is not or only slightly exerted because the slope of the humidification performance with respect to the air velocity between the humidification members is not changed.

Next, description is made of a relationship between the humidification performance and the angle θ1 formed between the downstream surface 6a of the airflow direction changing portion 6 and the flat surface 5a of the airflow direction changing plate 5.

Figure 11:
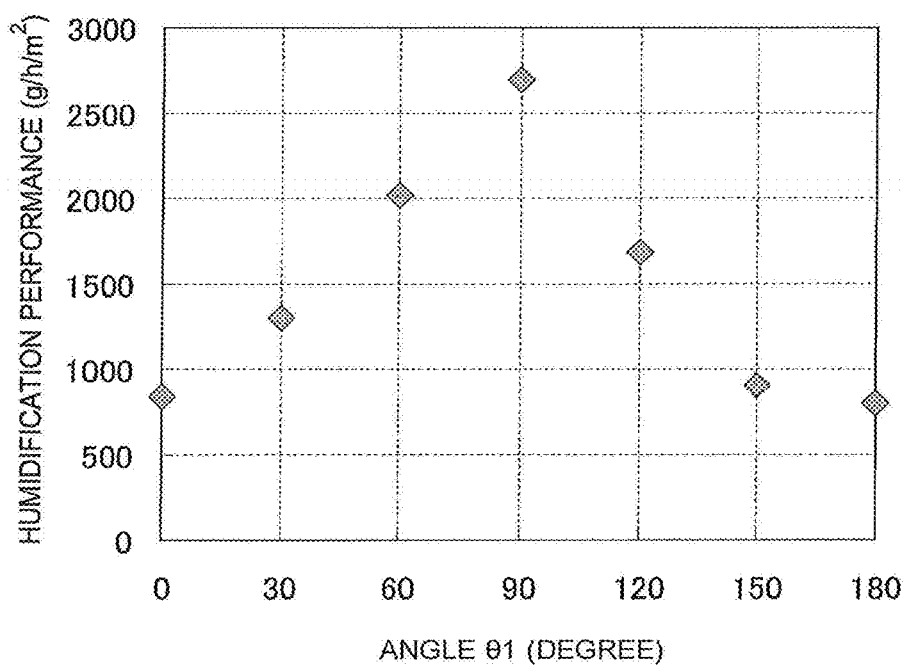
FIG. 11 is a graph showing an angle θ1 formed between a downstream surface 6a of an airflow direction changing portion 6 and a flat surface 5a in the humidifier 1 according to Embodiment 1 and results of measurement of the humidification performance of the humidifier 1.

FIG. 11 is a graph showing the angle θ1 formed between the downstream surface 6a of the airflow direction changing portion 6 and the flat surface 5a in the humidifier 1 according to Embodiment 1 and results of measurement of the humidification performance of the humidifier 1. In FIG. 11, the horizontal axis represents the angle θ1, and the vertical axis represents the humidification amount of the humidification member 4 per unit area and unit time as the humidification performance. As shown in FIG. 11, when the angle θ1 is 90 degrees, the maximum humidification performance is exhibited, and as a value of ±(90 degrees−θ1) is smaller, that is, as the angle θ1 is closer to 90 degrees, the humidification performance is higher.

Further, when the angle θ1 falls within a range of from 0 degrees to 90 degrees, as the angle θ1 is increased, that is, as the angle of separation of the distal end portion of the airflow direction changing portion 6 from the flat surface 5a toward the upstream side is increased, the humidification performance tends to be enhanced. When the angle θ1 falls within a range of more than 90 degrees, however, as the angle θ1 is increased, the humidification performance tends to be decreased. It is considered that the humidification performance is enhanced because the impingement of the air 31 on the humidification member 4 is promoted through the change of the airflow direction when the angle θ1 falls within the range of from 0 degrees to 90 degrees, but the humidification performance is decreased because the impingement on the humidification member 4 is suppressed as the angle θ1 is increased when the angle θ1 falls within the range of more than 90 degrees.

As described above, it is preferred that, on the flat surface 5a of the airflow direction changing plate 5 along which the air 31 passes, the airflow direction changing portions 6 of the airflow direction changing plate 5 be arranged at regular intervals to project in a direction intersecting with the airflow direction of the air 31 so that the air 31 impinges on the airflow direction changing portions 6. It is desired that each airflow direction changing portion 6 be formed so that the angle θ1 formed between the flat surface 5a of the airflow direction changing plate 5 and the downstream surface 6a of the airflow direction changing portion 6 (angle of separation of the airflow direction changing portion 6 from the flat surface 5a of the airflow direction changing plate 5 in the upstream direction) be 90 degrees or less. The reason is as follows. As the angle θ1 is closer to 90 degrees, the humidification performance is enhanced (see FIG. 11), but the amount of change of the humidification performance with respect to the air velocity between the humidification members differs depending on whether the angle θ1 is more than 90 degrees or less than 90 degrees (see FIG. 7 and FIG. 10). When the angle θ1 is less than 90 degrees, the amount of change of the humidification performance is increased along with increase in air velocity between the humidification members.

Note that, the airflow direction changing plate 5 illustrated in each of FIG. 5 and FIG. 8 includes the series of airflow direction changing portions 6 each extending in the vertical direction, which are arranged in an intermediate region defined between upper and lower end portions of the airflow direction changing plate 5. The specific shape of the airflow direction changing portion 6 is not limited to this shape, and the following shape may be employed instead.

FIG. 12 are explanatory views of an airflow direction changing plate 5 according to a modification example of Embodiment 1. FIG. 12(a) is a perspective view of the humidification member 4 and the airflow direction changing plate 5, and FIG. 12(b) is a view of the humidification member 4 and the airflow direction changing plate 5 when viewed in the airflow direction. In the example of FIG. 12, a plurality of airflow direction changing portions 6 are arranged in each opening portion 8 at intervals secured in the vertical direction. Further, as illustrated in FIG. 12(b), the airflow direction changing portions 6 project from the flat surfaces 5a on both sides of the airflow direction changing plate 5 alternately from side to side in the vertical direction, that is, in a staggered pattern. Also in this structure, turbulence can be caused in the air 31, and hence the gas-liquid contact between the air 31 and the humidification member 4 is promoted, thereby being capable of enhancing the humidification performance.

Further, the airflow direction changing portion 6 may have a flat shape, a columnar shape, a conical shape, a prism shape, a pyramid shape, or the like. The shape of the airflow direction changing portion 6 only needs to be determined in consideration of processability. Still further, the airflow direction changing portions 6 may be arranged in a staggered pattern or a juxtaposed pattern on both of the flat surfaces 5a of the airflow direction changing plate 5 along which the air 31 passes.

(Effects of Embodiment 1)

As in the above-mentioned structure, in the humidifier 1 and the air-conditioning apparatus 20 including the humidifier 1 according to this embodiment, the airflow direction changing plate 5 including the airflow direction changing portions 6 is arranged adjacent to the humidification member 4 or between the plurality of humidification members 4 via a given clearance secured between the airflow direction changing plate 5 and the humidification member 4. Therefore, the humidification amount of the humidification member 4 can greatly be increased without increasing the number and the area of the humidification members 4 and performing complicated processing for the shape of the humidification member 4. Besides, the performance of a single humidification member 4 can be enhanced, and hence the number of necessary humidification members 4 can be reduced. Therefore, the supply amount of the humidification water 30 can also be reduced, thereby being capable of achieving the operation at low running cost. Further, the humidification member 4 has the flat structure and the airflow direction changing plate 5 is arranged to face the humidification member 4. Thus, the pressure loss can be reduced as compared to, for example, the structure in which the humidification member 4 itself is deformed to cause turbulence in the air.

Embodiment 2

A humidifier 1 according to Embodiment 2 is described focusing on a difference from Embodiment 1. Note that, the humidifier 1 described in this embodiment is applicable to the air-conditioning apparatus 20 similarly to Embodiment 1.

Figure 13:
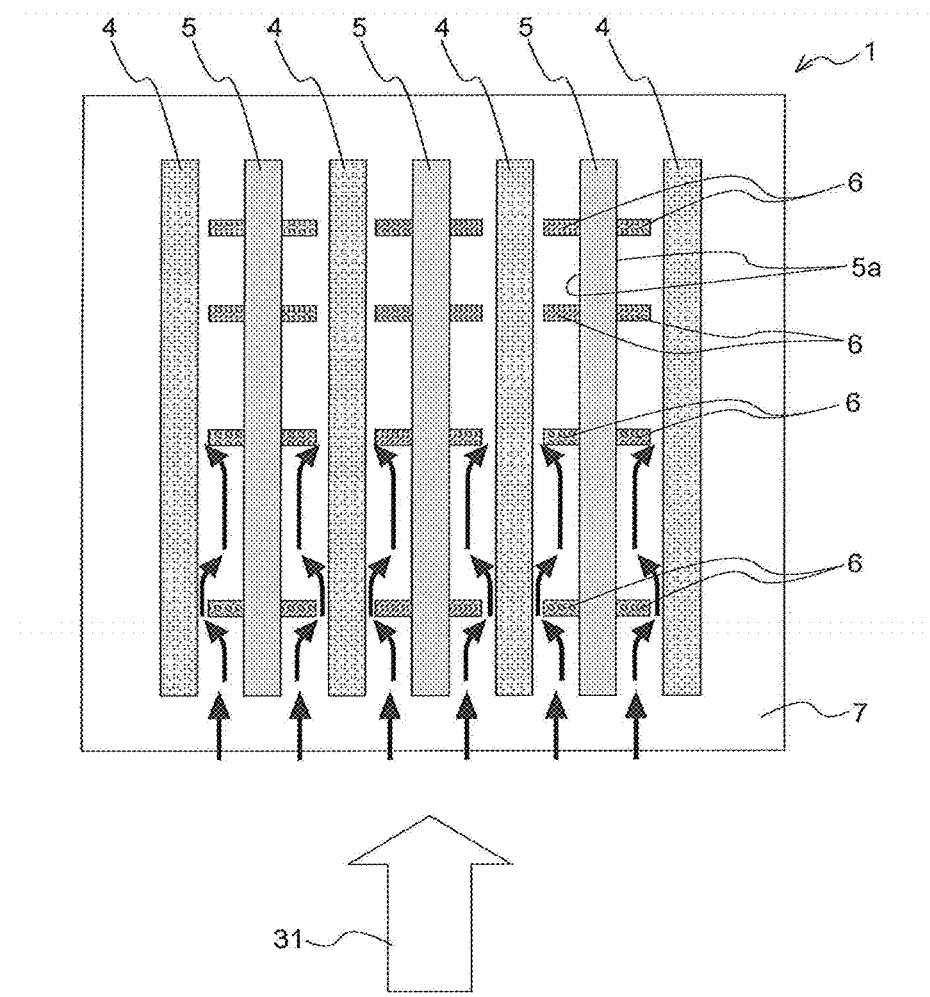
FIG. 13 is a schematic structural view of a humidifier 1 according to Embodiment 2 when viewed in a direction from directly above the humidifier 1, which is orthogonal to the airflow direction.

FIG. 13 is a schematic structural view of the humidifier 1 according to Embodiment 2 when viewed in a direction from directly above the humidifier 1, which is orthogonal to the airflow direction. In Embodiment 1, for example, as illustrated in FIG. 2, the plurality of airflow direction changing portions 6 are arranged at regular intervals along the airflow direction on the flat surface 5a of the airflow direction changing plate 5 along which the air 31 passes. In Embodiment 2, on the other hand, as illustrated in FIG. 13, the airflow direction changing portions 6 are arranged in the airflow direction at intervals larger on the upstream side than on the downstream side.

When the humidification operation is performed by supplying the humidification water 30 to the humidification member 4, the air 31 on the upstream side of the humidification member 4 is first humidified, and hence the air 31 on the downstream side has higher relative humidity than that on the upstream side. The humidification capability is proportional to vapor pressure, and hence, when the humidity of the air is high, the humidification performance is decreased. Thus, at a position closer to the downstream side of the humidification member 4, the amount of the humidification water 30 that is evaporated from the humidification member 4 is decreased. For this reason, in order to promote the humidification on the downstream side of the humidification member 4, the plurality of airflow direction changing portions 6 are arranged on the airflow direction changing plate 5 in the airflow direction at intervals larger on the upstream side than on the downstream side.

The operation is similar to that of Embodiment 1, and description thereof is therefore omitted herein.

(Effects of Embodiment 2)

As in Embodiment 2, with the structure in which the airflow direction changing portions 6 are arranged at intervals larger on the upstream side, the turbulence of the air 31 is promoted on the downstream side. When the turbulent air 31 is brought into contact with the planar surface of the humidification member 4, which is located on the downstream side, the air 31 is humidified with high evaporability. Therefore, the air 31 on the downstream side, which is higher in water saturation rate than on the upstream side, can be humidified with high efficiency, thereby being capable of attaining a high humidification amount. Further, the performance of a single humidification member 4 can be enhanced, and hence the number of necessary humidification members 4 can be reduced. Therefore, the supply amount of the humidification water 30 can also be reduced, thereby being capable of achieving the operation at low running cost.

Further, the air 31 having low humidity flows into the upstream side of the humidification member 4, and hence the humidification is promoted on the upstream side. As a result, scale components contained in tap water may deposit on the upstream side of the humidification member 4 to clog porous portions of the humidification member 4. Thus, the humidification performance may be decreased. In Embodiment 2, the downstream side of the humidification member 4 is humidified actively, and hence the evaporation amounts of the humidification member 4 on the upstream side and the downstream side can be equalized substantially, while the depositions of the scales can also be equalized substantially. Consequently, the life of the humidification member 4 can be prolonged.

Embodiment 3

A humidifier 1 according to Embodiment 3 is described focusing on a difference from Embodiment 1. Note that, the humidifier 1 described in this embodiment is applicable to the air-conditioning apparatus 20 similarly to Embodiment 1.

Figure 14:
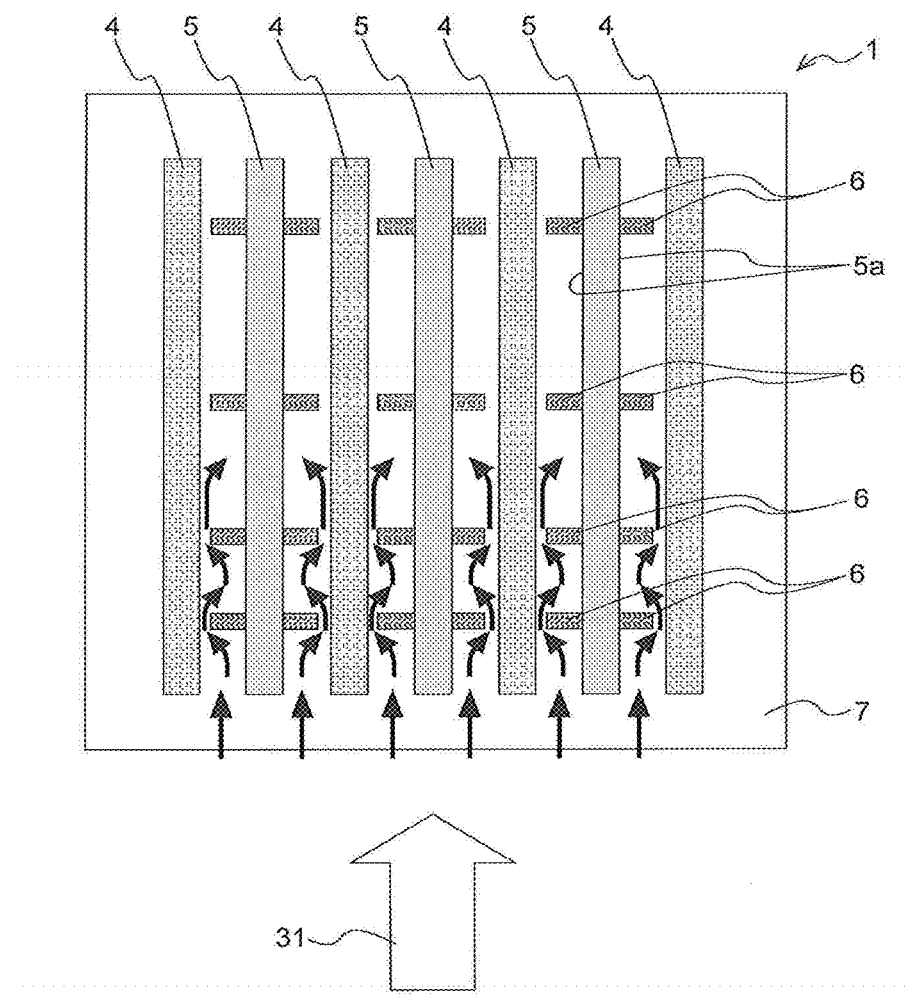
FIG. 14 is a schematic structural view of a humidifier 1 according to Embodiment 3 when viewed in a direction from directly above the humidifier 1, which is orthogonal to the airflow direction.

FIG. 14 is a schematic structural view of the humidifier 1 according to Embodiment 3 when viewed in a direction from directly above the humidifier 1, which is orthogonal to the airflow direction. In Embodiment 1, for example, as illustrated in FIG. 2, the plurality of airflow direction changing portions 6 are arranged at regular intervals along the airflow direction on the flat surface 5a of the airflow direction changing plate 5 along which the air 31 passes. In Embodiment 3, on the other hand, as illustrated in FIG. 14, the airflow direction changing portions 6 are arranged in the airflow direction at intervals smaller on the upstream side than on the downstream side.

When the humidification operation is performed by supplying the humidification water 30 to the humidification member 4, the humidification capability is proportional to the vapor pressure, and hence, when the humidity of the air is low, the humidification performance is enhanced. For this reason, in order to promote the humidification on the upstream side of the humidification member 4, the plurality of airflow direction changing portions 6 are arranged on the airflow direction changing plate 5 in the airflow direction at intervals smaller on the upstream side than on the downstream side.

The operation is similar to that of Embodiment 1, and description thereof is therefore omitted herein.

(Effects of Embodiment 3)

As in Embodiment 3, with the structure in which the airflow direction changing portions 6 are arranged at intervals smaller on the upstream side, the turbulence of the air 31 is further promoted on the upstream side. When the turbulent air 31 is brought into contact with the planar surface of the humidification member 4, which is located on the upstream side, the air 31 is humidified with high evaporability. Note that, the air having a high water saturation rate is caused to flow on the downstream side, but the humidification effect is imparted by the airflow direction changing portions 6. Further, the performance of a single humidification member 4 can be enhanced, and hence the number of necessary humidification members 4 can be reduced. Therefore, the supply amount of the humidification water 30 can also be reduced, thereby being capable of achieving the operation at low running cost.

Embodiment 4

A humidifier 1 according to Embodiment 4 is described focusing on a difference from Embodiment 1. Note that, the humidifier 1 described in this embodiment is applicable to the air-conditioning apparatus 20 similarly to Embodiment 1.

Figure 15:
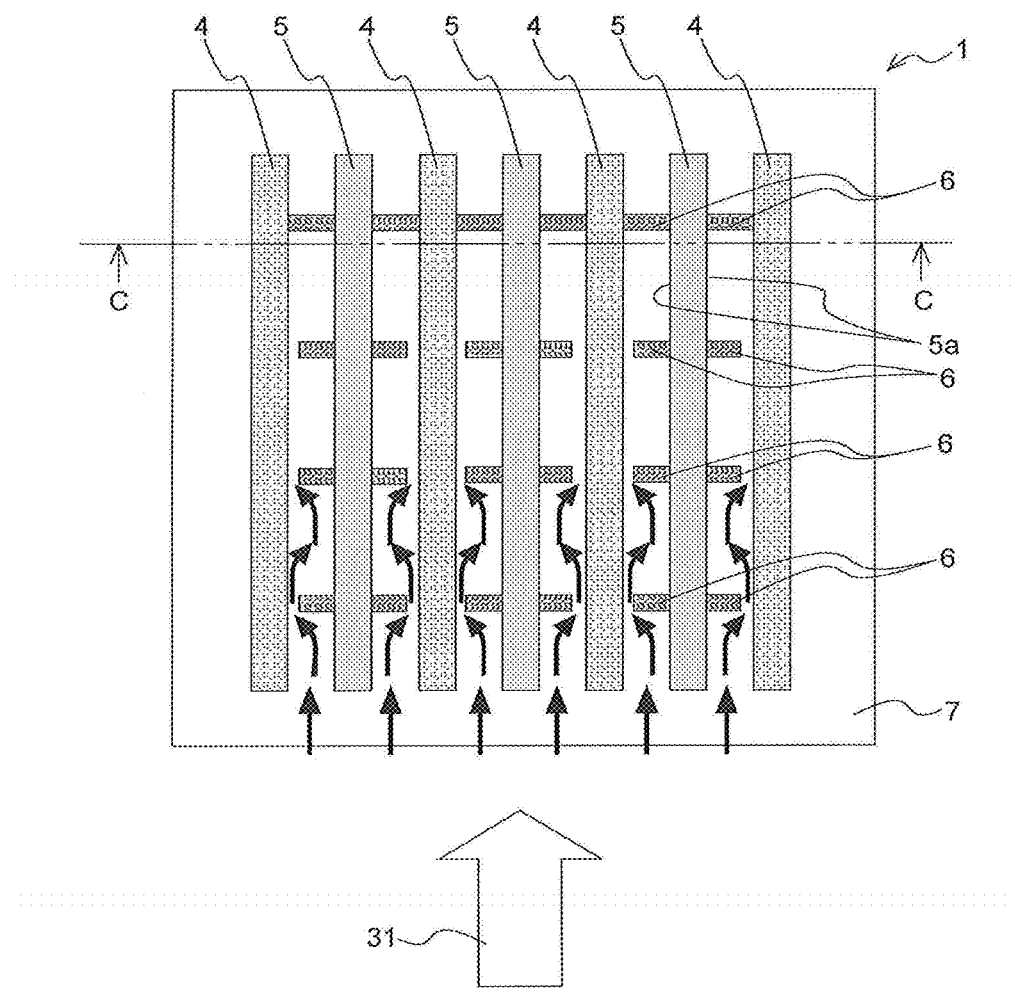
FIG. 15 is a schematic structural view of a humidifier 1 according to Embodiment 4 when viewed in a direction from directly above the humidifier 1, which is orthogonal to the airflow direction.

FIG. 15 is a schematic structural view of the humidifier 1 according to Embodiment 4 when viewed in a direction from directly above the humidifier 1, which is orthogonal to the airflow direction. FIG. 16 is a schematic sectional view taken along the line C-C of FIG. 15. In Embodiment 1, as illustrated in FIG. 1, FIG. 2, and the like, the airflow direction changing portions 6 are arranged on the flat surface 5a of the airflow direction changing plate 5 along which the air 31 passes, and a given clearance is secured between the distal end portion of each airflow direction changing portion 6 and the humidification member 4. On the other hand, as illustrated in FIG. 15 and FIG. 16, Embodiment 4 is different from Embodiment 1 in that a part of the airflow direction changing portion 6 arranged on the downstream side is held in contact with the humidification member 4. The part of the airflow direction changing portion 6 is held in contact with the opposing humidification member 4, but the airflow direction changing portion 6 does not completely close the air passage. As illustrated in FIG. 16, an opening 6c is formed in a part of the airflow direction changing portion 6 to secure the air passage between the airflow direction changing plate 5 and the humidification member 4. Note that, the shape of the opening 6c formed in the airflow direction changing portion 6 is not limited to the shape illustrated in FIG. 16, and an arbitrary shape for securing the air passage of the air 31 may be employed.

When the humidification operation is performed by supplying the humidification water 30 to the humidification member 4, the air 31 on the upstream side of the humidification member 4 is first humidified, and hence the air 31 on the downstream side has lower temperature due to evaporation heat of water. Therefore, the downstream side of the humidification member 4 is exposed to low-temperature air. In this case, based on temperature dependency of the vapor pressure of water, which is derived from the Antoine equation, the vapor pressure is decreased as the temperature is decreased. Thus, the evaporability is decreased on the downstream side of the humidification member 4, thereby hindering the humidification performance from being enhanced. Therefore, in Embodiment 4, the part of the airflow direction changing portion 6 is held in contact with the humidification member 4 that is arranged with a space secured therebetween.

The operation is similar to that of Embodiment 1, and description thereof is therefore omitted herein.

(Effects of Embodiment 4)

As in Embodiment 4, with the structure in which the part of the airflow direction changing portion 6 of the airflow direction changing plate 5 is held in contact with the humidification member 4 that is arranged with a space secured therebetween, cooling energy of the humidification member 4 can be moved to the airflow direction changing plate 5. That is, when the part of the airflow direction changing portion 6 is held in contact with the humidification member 4, heat can be supplied to the humidification member 4. On the other hand, the air 31 before the temperature decrease due to the evaporation heat is continuously supplied to the airflow direction changing plate 5, and hence the cooling energy of the humidification member 4 can be absorbed. Thus, the temperature decrease of the humidification member 4 is suppressed, thereby being capable of enhancing the humidification performance. Further, the performance of a single humidification member 4 can be enhanced, and hence the number of necessary humidification members 4 can be reduced. Therefore, the supply amount of the humidification water 30 can also be reduced, thereby being capable of achieving the operation at low running cost.

Further, greater effects of Embodiment 4 can be attained when a material having high thermal conductivity as typified by, for example, a metal such as copper, aluminum, or nickel or a noble metal such as gold, silver, or platinum is used for the airflow direction changing plate 5.

Still further, the downstream side of the humidification member 4 is preferred as a position where the airflow direction changing portion 6 is held in contact with the humidification member 4. On the downstream side, the temperature of the air 31 is decreased due to the evaporation heat of water, and hence, when the airflow direction changing portion 6 is held in contact with the downstream side of the humidification member 4, heat can be supplied from the airflow direction changing portion 6 to the downstream part of the humidification member 4. Thus, the temperature decrease on the downstream side of the humidification member 4 can be suppressed.

Embodiment 5

A humidifier 1 according to Embodiment 5 is described focusing on a difference from Embodiment 1. Note that, the humidifier 1 described in this embodiment is applicable to the air-conditioning apparatus 20 similarly to Embodiment 1.

Figure 17:
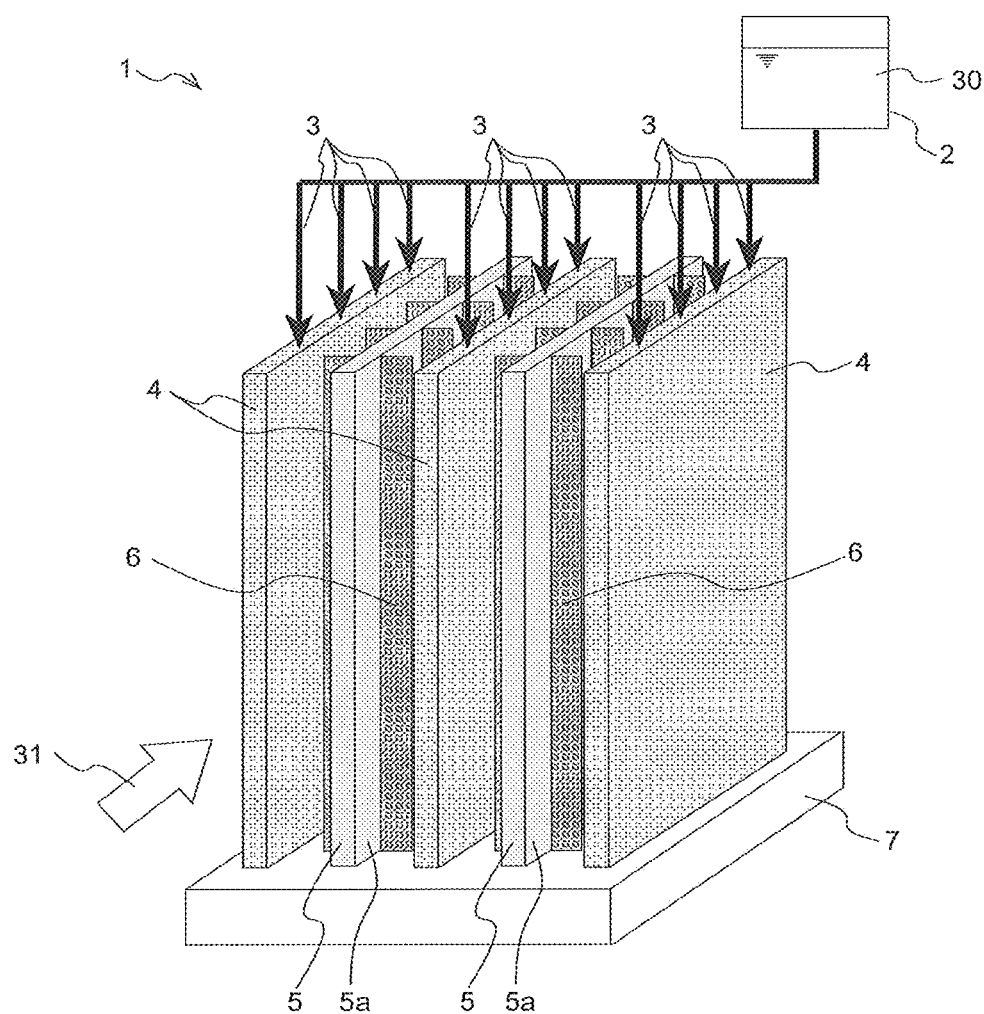
FIG. 17 is a schematic structural view of a humidifier 1 according to Embodiment 5.
Figure 18:
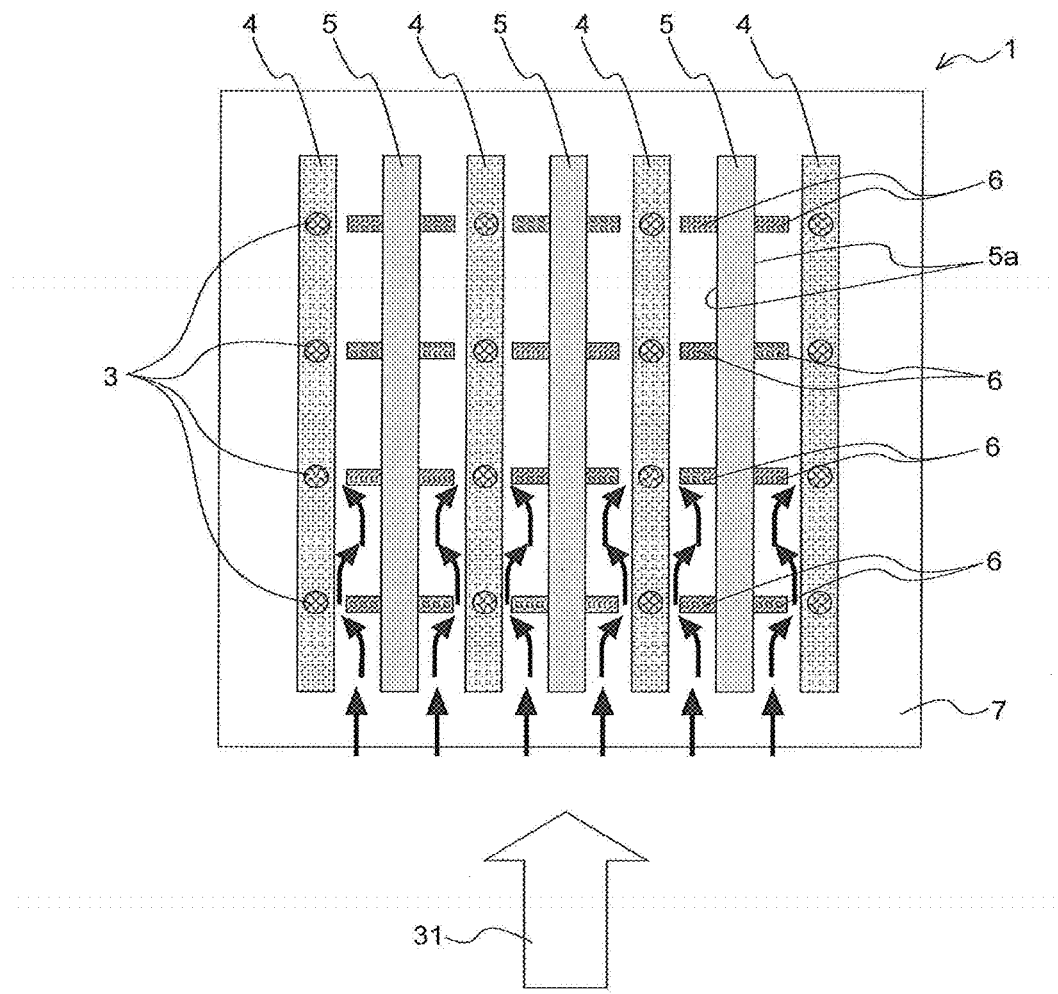
FIG. 18 is a schematic structural view of the humidifier 1 according to Embodiment 5 when viewed in a direction from directly above the humidifier 1, which is orthogonal to the airflow direction.

FIG. 17 is a schematic structural view of the humidifier 1 according to Embodiment 5. FIG. 18 is a schematic structural view of the humidifier 1 according to Embodiment 5 when viewed in a direction from directly above the humidifier 1, which is orthogonal to the airflow direction.

In Embodiment 1, as illustrated in FIG. 1, each nozzle 3 is arranged at one position corresponding to the center of the humidification member 4 in the airflow direction, and the humidification water 30 is supplied to the humidification member 4 through the nozzle 3 thus arranged at one position. In Embodiment 5, on the other hand, as illustrated in FIG. 17 and FIG. 18, a plurality of nozzles 3 are arranged above the humidification member 4 along the airflow direction. Further, in Embodiment 5, the nozzles 3 are arranged above portions of the humidification member 4, which are opposed to the airflow direction changing portions 6.

As illustrated in FIG. 6 in Embodiment 1, the airflow direction changing plate 5 including the airflow direction changing portions 6 is arranged so that the humidification performance is greatly enhanced as compared to the comparative example in which the metal plate is arranged. In the portions of the humidification member 4, which are arranged in the vicinity of the airflow direction changing portions 6, on the other hand, the evaporability of the humidification water 30 is enhanced by the turbulent air 31. General tap water is normally used as the humidification water 30, and hence impurities contained in the tap water are liable to accumulate at the portions of the humidification member 4, which are arranged in the vicinity of the airflow direction changing portions 6. For example, calcium ions are not evaporated and hence concentrated in the humidification member 4. The calcium ions react with carbon dioxide in the gas phase so that solid calcium carbonate is generated. Along with use over time, the calcium carbonate covers the surface of the humidification member 4 to degrade the water absorption capability of the humidification member 4, ending up with decrease in humidification performance. Therefore, in Embodiment 5, the nozzles 3 are arranged above the portions of the humidification member 4, which are opposed to the airflow direction changing portions 6, to thereby supply the humidification water 30 intensively to the portions positioned in the vicinity of the airflow direction changing portions 6, at which the evaporation of the humidification water 30 is progressed easily. With this structure, the concentration of the impurities that may accumulate on the humidification member 4 is reduced to clear the impurities. Note that, the arrangement of the nozzles 3 is not strictly limited to the positions above the portions of the humidification member 4, which are opposed to the airflow direction changing portions 6, as long as the humidification water 30 can be supplied to the portions of the humidification member 4, which are relatively high in evaporability due to actions of the airflow direction changing portions 6.

The operation is similar to that of Embodiment 1, and description thereof is therefore omitted herein.

(Effects of Embodiment 5)

At the portions of the humidification member 4, which are arranged in the vicinity of the airflow direction changing portions 6, the evaporation of the humidification water 30 is progressed easily by the turbulent air 31. As in Embodiment 5, when the humidification water 30 is supplied intensively through the nozzles 3 to the portions of the humidification member 4, at which the evaporation is progressed easily, the accumulation of the impurities contained in the tap water on the humidification member 4 is suppressed. Consequently, the life of the humidification member 4 can be prolonged. Further, the performance of a single humidification member 4 can be enhanced, and hence the number of necessary humidification members 4 can be reduced. Therefore, the supply amount of the humidification water 30 can also be reduced, thereby being capable of achieving the operation at low running cost.

The invention claimed is:

1. A humidifier, comprising:
   a flat humidification member formed of a water absorbing member and arranged in an upright posture;
   a water supply unit configured to supply water to the flat humidification member; and
   an airflow direction changing plate arranged with a clearance secured between the airflow direction changing plate and the flat humidification member,
   wherein air passes through the clearance secured between the airflow direction changing plate and the flat humidification member from an upstream end portion to a downstream end portion of the humidification member, and
   wherein, on a surface of the airflow direction changing plate opposed to the flat humidification member, an airflow direction changing portion is arranged to project toward the flat humidification member, the airflow direction changing portion being configured to change a direction of an air current flowing between the flat humidification member and the airflow direction changing plate, and further, the airflow direction changing plate has an opening portion,
   wherein an interval between adjacent ones of the airflow direction changing portions is different at the upstream end portion of the humidification member as compared to the downstream end portion of the humidification member.

2. The humidifier of claim 1, wherein the airflow direction changing portion causes air flowing between the flat humidification member and the airflow direction changing plate to flow in a direction normal to a planar surface of the flat humidification member.

3. The humidifier of claim 1, wherein an angle formed between a downstream surface of the airflow direction changing portion and the surface of the airflow direction changing plate having the airflow direction changing portion fixed thereto is 90 degrees or less.

4. The humidifier of claim 1, wherein the airflow direction changing portion projects from a side of the opening portion on an upstream side.

5. The humidifier of claim 1, wherein the water supply unit supplies the water to a portion of the flat humidification member, which is opposed to the airflow direction changing portion.

6. A humidifier, comprising:
   a flat humidification member formed of a water absorbing member and arranged in an upright posture;
   a water supply unit configured to supply water to the flat humidification member; and
   an airflow direction changing plate arranged with a clearance secured between the airflow direction changing plate and the flat humidification member,
   wherein air passes through the clearance secured between the airflow direction changing plate and the flat humidification member from an upstream end portion to a downstream end portion of the humidification member, and
   wherein, on a surface of the airflow direction changing plate opposed to the flat humidification member, an airflow direction changing portion is arranged to project toward the flat humidification member, the airflow direction changing portion being configured to change a direction of an air current flowing between the flat humidification member and the airflow direction changing plate, and further, the airflow direction changing plate has an opening portion,
   wherein a part of the airflow direction changing portion is held in contact with a portion of the flat humidification member on the downstream side.

7. An air-conditioning apparatus, comprising a humidifier, the humidifier including
   a flat humidification member formed of a water absorbing member and arranged in an upright posture,
   a water supply device configured to supply water to the flat humidification member, and an airflow direction changing plate arranged with a clearance secured between the airflow direction changing plate and the flat humidification member, wherein air passes through the clearance secured between the airflow direction changing plate and the flat humidification member from an upstream end portion to a downstream end portion of the humidification member, and wherein, on a surface of the airflow direction changing plate opposed to the flat humidification member, an airflow direction changing portion is arranged to project toward the flat humidification member, the airflow direction changing portion being configured to change a direction of an air current flowing between the flat humidification member and the airflow direction changing plate, and further, the airflow direction changing plate has an opening portion, wherein an interval between adjacent ones of the airflow direction changing portions is different at the upstream end portion of the humidification member as compared to the downstream end portion of the humidification member.

* * * * *